US008406727B2

(12) United States Patent
Liao

(10) Patent No.: US 8,406,727 B2
(45) Date of Patent: Mar. 26, 2013

(54) TIMER CONFIGURATION METHOD

(75) Inventor: Ching-Yu Liao, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 13/372,514

(22) Filed: Feb. 14, 2012

(65) Prior Publication Data

US 2012/0208486 A1    Aug. 16, 2012

Related U.S. Application Data

(60) Provisional application No. 61/452,174, filed on Mar. 14, 2011, provisional application No. 61/475,681, filed on Apr. 15, 2011, provisional application No. 61/442,465, filed on Feb. 14, 2011, provisional application No. 61/483,761, filed on May 9, 2011.

(51) Int. Cl.
*H04M 11/04* (2006.01)
*H04J 3/24* (2006.01)

(52) U.S. Cl. ............................ 455/404.1; 370/349

(58) Field of Classification Search .......... 455/450, 455/404.1, 445, 435.1, 426.1, 404.2, 434; 370/230, 349, 329, 259, 238

See application file for complete search history.

(56) References Cited

U.S. PATENT DOCUMENTS

| 2002/0163906 | A1* | 11/2002 | Diachina et al. ............. 370/349 |
| 2004/0192252 | A1* | 9/2004 | Aerrabotu et al. ......... 455/404.1 |
| 2009/0305707 | A1* | 12/2009 | Pudney ........................ 455/445 |
| 2011/0171926 | A1* | 7/2011 | Faccin et al. ............... 455/404.1 |
| 2011/0201343 | A1* | 8/2011 | Pinheiro et al. ............. 455/450 |

OTHER PUBLICATIONS

3GPP TS 23.401 V10.1.0 (Sep. 2010) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 10).
3GPP TS 24.301 V10.0.0 (Sep. 2010) Technical Specification 3rd Generation Partnership Project; Technical Specification Group Core Network and Terminals; Non-Access-Stratum (NAS) protocol for Evolved Packet System (EPS); Stage 3 (Release 10).
3GPP TS 24.008 V10.0.0 3rd Generation Partnership Project; Technical Specification Group Core Network and Terminals; Mobile radio interface Layer 3 specification; Core network protocols; Stage 3 (Release 10), Sep. 2010.
3GPP TSG-CT WG1 Meeting #67, C1-104431, Barcelona, Spain, Oct. 11-15, 2010.
3GPP TSG-SA WG2 Meeting #83, S2-111253, Salt Lake City, USA, Feb. 21-25, 2011.
3GPP TSG SA WG2 Meeting #83, S2-111204, Feb. 21-25, 2011, Salt Lake City, Utah, USA.
3GPP TSG-CT WG1 Meeting #70, C1-111522, Salt Lake City, Utah (USA), Feb. 21-25, 2011.
3GPP TSG-CT WG1 Meeting #70, C1-111164, Salt Lake City, Utah (USA), Feb. 21-25, 2011.
3GPP TSG-CT WG1 Meeting #70, C1-110789, Salt Lake City, Utah (USA), Feb. 21-25, 2011.
3GPP TSG-CT WG1 Meeting #70, C1-110788, Salt Lake City, Utah (USA), Feb. 21-25, 2011.

(Continued)

*Primary Examiner* — Kiet Doan
(74) *Attorney, Agent, or Firm* — Winston Hsu; Scott Margo

(57) ABSTRACT

A method of handing an emergency PDN connection when a back-off timer is running for a core network in a wireless communication system is disclosed. The method comprises starting a mobile reachable timer when a mobile device enters an idle mode, wherein the mobile reachable timer has a first timer value; accepting the emergency PDN connection; stopping the mobile reachable timer when the mobile device enters a connected mode to establish the emergency PDN connection; resetting the mobile reachable timer to a second timer value when a remaining time of the back-off timer is longer than a periodic area update timer; and restarting the mobile reachable timer according to the second timer value when the emergency PDN is disconnected.

13 Claims, 10 Drawing Sheets

OTHER PUBLICATIONS

3GPP TSG-CT WG1 Meeting #69, C1-110745, Ljubljana (Slovenia), Jan. 24-28, 2011.

3GPP TSG-CT WG1 Meeting #69, C1-110744, Ljubljana (Slovenia), Jan. 24-28, 2011.

European patent application No. 12000954.3, European application filing date: Feb. 14, 2012, European Search Report mailing date: Jul. 31, 2012.

Zte, "Emergency attach during back off duration", 3GPP TSG-CT WG1 Meeting #69, C1-110415, Jan. 24-28, 2011, Ljubljana(Slovenia), XP050479808, pp. 1-3.

HTC Corp., "Handling of periodic TAU timer, mobile reachable timer and MM back-off timer", 3GPP TSG CT WG1 Meeting #69, C1-110181, Jan. 24-28, 2011, Ljubljana(Slovenia), XP050479627, pp. 1-4.

ETSI TS 124 301 V8.8.0 (Jan. 2011), "Universal Mobile Telecommunications System (UMTS); LTE; Non-Access-Stratum (NAS) protocol for Evolved Packet System (EPS); Stage 3 (3GPP TS 24.301 version 8.8.0 Release 8)", XP014061911, coverpage, pp. 1-262.

European patent application No. 12001754.6, European Search Report mailing date: Apr. 18, 2012.

Catt, "UE supports the NAS back-off timer", 3GPP TSG SA WG2 Meeting #81, S2-104878, Oct. 11-15, 2010, Prague, Czech Republic, XP050459666, pp. 1-2.

European patent application No. 11008794.7, European Search Report mailing date: Feb. 29, 2012.

ETSI TS 124 008 V9.4.0 (Oct. 2010), "Digital cellular telecommunications system (Phase 2+); Universal Mobile Telecommunications System (UMTS); LTE; Mobile radio interface Layer 3 specification; Core network protocols; Stage 3 (3GPP TS 24.008 version 9.4.0 Release 9)", XP014061450, p. 118 line 22-25 and line 41-42, p. 119 line 10-13 and line 25-28, par. 9.4.14, par. 9.4.17, par. 9.4.17.1, table 9.4.17 and table 11.3a.

Ericsson, ST-Ericsson, "Evaluation and conclusion of overload congestion control", 3GPP TSG SA WG2 Meeting #79electronic, TD S2-103135, Elbonia, Jul. 6-10, 2010, XP050458220, p. 1-3.

Liao, Title of Invention: Timer Configuration Method and Related Communication Device, U.S. Appl. No. 13/288,973, filed Nov. 4, 2011.

* cited by examiner

TIMER CONFIGURATION METHOD

CROSS REFERENCE TO RELATED APPLICATIONS

This application claims the benefit of U.S. Provisional Application No. 61/452,174, filed on Mar. 14, 2011 and entitled "Method to handle periodic timer, mobile reachability timer, and MM backoff timer" and the benefit of U.S. Provisional Application No. 61/475,681, filed on Apr. 15, 2011 and entitled "Method to handle periodic timer, mobile reachability timer, and MM backoff timer", and the benefit of U.S. Provisional Application No. 61/442,465, filed on Feb. 14, 2011 and entitled "Method to handle mobile reachable timer for emergency PDN connection during running MM backoff timer", and the benefit of U.S. Provisional Application No. 61/483,761, filed on May 9, 2011 and entitled "Method to handle mobile reachable timer for emergency PDN connection during running MM backoff timer", the contents of which are incorporated herein in their entirety.

BACKGROUND OF THE INVENTION

1. Field of the Invention

The application relates to a method and a related communication device used in a wireless communication system and related communication device, and more particularly, to a timer configuration method for an emergency packet data network connection in a wireless communication system.

2. Description of the Prior Art

A long-term evolution (LTE) system supporting the 3GPP Rel-8 standard and/or the 3GPP Rel-9 standard is developed by the 3rd Generation Partnership Project (3GPP) as a successor of a universal mobile telecommunications system (UMTS), for further enhancing performance of the UMTS to satisfy users' increasing needs. The LTE system includes a new radio interface and radio network architecture that provides a high data rate, low latency, packet optimization, and improved system capacity and coverage. In the LTE system, a radio access network known as an evolved UTRAN (E-UTRAN) includes multiple evolved NBs (eNBs) for communicating with multiple user equipments (UEs), and communicates with a core network including a mobility management entity (MME), serving gateway, etc for Non Access Stratum (NAS) control. In UMTS system, a Serving GPRS Support Node (SGSN) is responsible for the delivery of data packets to the mobile devices back and forth within its geographical service area, including packet routing and transfer, mobility management (attach/detach and location management), logical link management, and authentication and charging functions. The MME also provides the control plane function for mobility between LTE and 2G/3G access networks with the S3 interface terminating at the MME from the SGSN.

An access point name (APN) is used in the LTE system and the LTE-A system for establishing packet data connections, and is managed by the MME. Further, the APN is used for identifying a packet data network (PDN) or a service type (e.g. multimedia messaging service (MMS)), wherein the PDN or the service type is carried on the packet data connections.

The core network manages the mobile reachability by using mobile reachable timer, paging proceed factor (PPF), and implicit detach timer. The core network supervises the periodic tracking/routing/location area updating procedure of the UE by means of the mobile reachable timer. By default, the mobile reachable timer is set slightly larger than the periodic TAU/RAU/LAU timer. Upon expiry of the mobile reachable timer the network shall clear the PPF flag and start the implicit detach timer. The value of the implicit detach timer is network dependent. Due to the clear of the PPF, the core network cannot page the UE during the period of the implicit detach timer. If the implicit detach timer expires before the UE contacts the network, the network shall implicitly detach the UE. The implicit detach timer shall be stopped when a NAS signaling connection is established for the UE.

NAS level congestion control contains the functions: "APN based congestion control" and "General NAS level Mobility Management control". The use of the APN based congestion control is for avoiding and handling of EMM and ESM signalling congestion associated with UEs with a particular APN. With General NAS level Mobility Management control, the MME may also use the reject of NAS level Mobility Management signaling requests under general congestion conditions.

When the NAS level mobility management congestion control is applied due to network overload or congestion, the MME rejects an attach request, a tracking area update (TAU), a routing area update (RAU) or a service request, and the MME replies the UE with a Mobility Management back-off timer.

When congestion control is active, the MME/SGSN stores the Mobility Management back-off timer and the Session Management back-off timer. Then the MME/SGSN enforces the stored back-off time by immediately rejecting any subsequent request from the UE targeting at connecting to the APN before the stored back-off time is expired.

However, the UE is allowed to initiate a Mobility Management procedure or a Session Management procedure with the APN for a high priority service or an emergency service, even when the Mobility Management back-off timer or the Session Management back-off timer is running. In this situation, since the APN is still in the congestion and has no resource for providing the high priority service or the emergency service, the MME rejects the high priority service or the emergency service, and a delay to access the high priority service or the emergency service is caused. Therefore, disaster may happen due to the delay of the high priority service or the emergency service.

When MME/SGSN performs NAS level congestion control, the MME/SGSN stores a Mobility Management back-off time and a Session Management back-off time. Then the MME/SGSN enforces the stored back-off time by immediately rejecting any subsequent MM/SM request from the UE and allocating a MM/SM back-off timer. However the MME/SGSN does not stores allocated MM/SM back-off timer in the EMM/ESM (EPS Mobility Management, EMM/EPS Session Management, ESM) context per UE basis.

For a normal attached UE, if it gets rejection with a MM back-off timer due to tracking area update reject or service reject. The UE is normal attached (EMM-Registered state) but enters ECM-IDLE mode when the MM back-off timer is running. When MM back-off timer is running, the back-off UE is still allowed to make emergency call by PDN connection request with request type of emergency to an emergency APN.

When the NAS signaling connection is built due to emergency PDN connection request and the UE returns from ECM-IDLE mode to ECM-Connected mode, the network stops the mobile reachable timer.

After the UE disconnects emergency PDN connection and NAS signaling connection is released, the mobile reachable timer is reset and started with its initial value. The issue occurs when the MM back-off timer is not expired yet and the remaining time of the MM back-off timer is larger than periodic TAU timer. If the network resets the mobile reachable timer to its initial value, the mobile reachable timer is not able to reflect the remaining time of the MM back-off timer on the UE. Thus the network may lose the track of the UE activity.

In addition, for a normal attached UE with one non-emergency PDN connection and one emergency PDN connection, if it gets rejection with a MM back-off timer due to tracking area update reject or service reject from the non-emergency PDN connection.

After the UE disconnects emergency PDN connection and NAS signaling connection is released, the mobile reachable timer is reset and started with its initial value. The issue occurs when the MM back-off timer is not expired yet and the remaining time of the MM back-off timer is larger than periodic TAU timer. If the network resets the mobile reachable timer to its initial value, the mobile reachable timer is not able to reflect the remaining time of the MM back-off timer on the UE. Thus the network may lose the track of the UE activity.

SUMMARY OF THE INVENTION

A method of handing an emergency PDN connection when a back-off timer is running for a core network in a wireless communication system is provided.

A method of handing an emergency PDN connection when a back-off timer is running for a core network in a wireless communication system is disclosed. The method comprises starting a mobile reachable timer when a mobile device enters an idle mode, wherein the mobile reachable timer has a first timer value; accepting the emergency PDN connection; stopping the mobile reachable timer when the mobile device enters a connected mode to establish the emergency PDN connection; resetting the mobile reachable timer to a second timer value when a remaining time of the back-off timer is longer than a periodic area update timer; and resetting the mobile reachable timer according to the second timer value when the emergency PDN connection is disconnected and a remaining time of the mobile reachable timer is longer than a periodic area update timer.

A method of handing an emergency PDN connection when a back-off timer is running for a core network in a wireless communication system is disclosed. The method comprises starting a mobile reachable timer when a mobile device enters an idle mode; accepting the emergency PDN connection; and not stopping the mobile reachable timer or an implicit detach timer when the mobile device enters a connected mode to establish the emergency PDN connection.

A method of handing an emergency PDN connection when a back-off timer is running for a core network in a wireless communication system is disclosed. The method comprises starting a mobile reachable timer when a mobile device enters an idle mode; accepting the emergency PDN connection; stopping the mobile reachable timer when the mobile device enters a connected mode to establish the emergency PDN connection; and determining whether to reset the mobile reachable timer according to the mobile reachable timer and a periodic area update timer.

A method of handling an emergency PDN connection when a back-off timer is running for a mobile device in a wireless communication system is disclosed. The method comprises disconnecting the emergency PDN connection when the MM back-off timer is running; and sending a remaining time of the back-off timer in a PDN disconnect request message or a deactivate bearer accept message when a remaining time of the back-off timer is greater than a periodic area update timer when the mobile device disconnects the emergency PDN connection when a remaining time of the back-off timer is larger than a periodic area update timer.

A method of handing an emergency PDN connection when a back-off timer is running for a core network in a wireless communication system is disclosed. The method comprises setting a mobile reachable timer and an implicit detach timer according to a summation of a periodic area update timer and the implicit detach timer; starting the mobile reachable timer and the implicit timer when the emergency PDN connection is disconnected.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
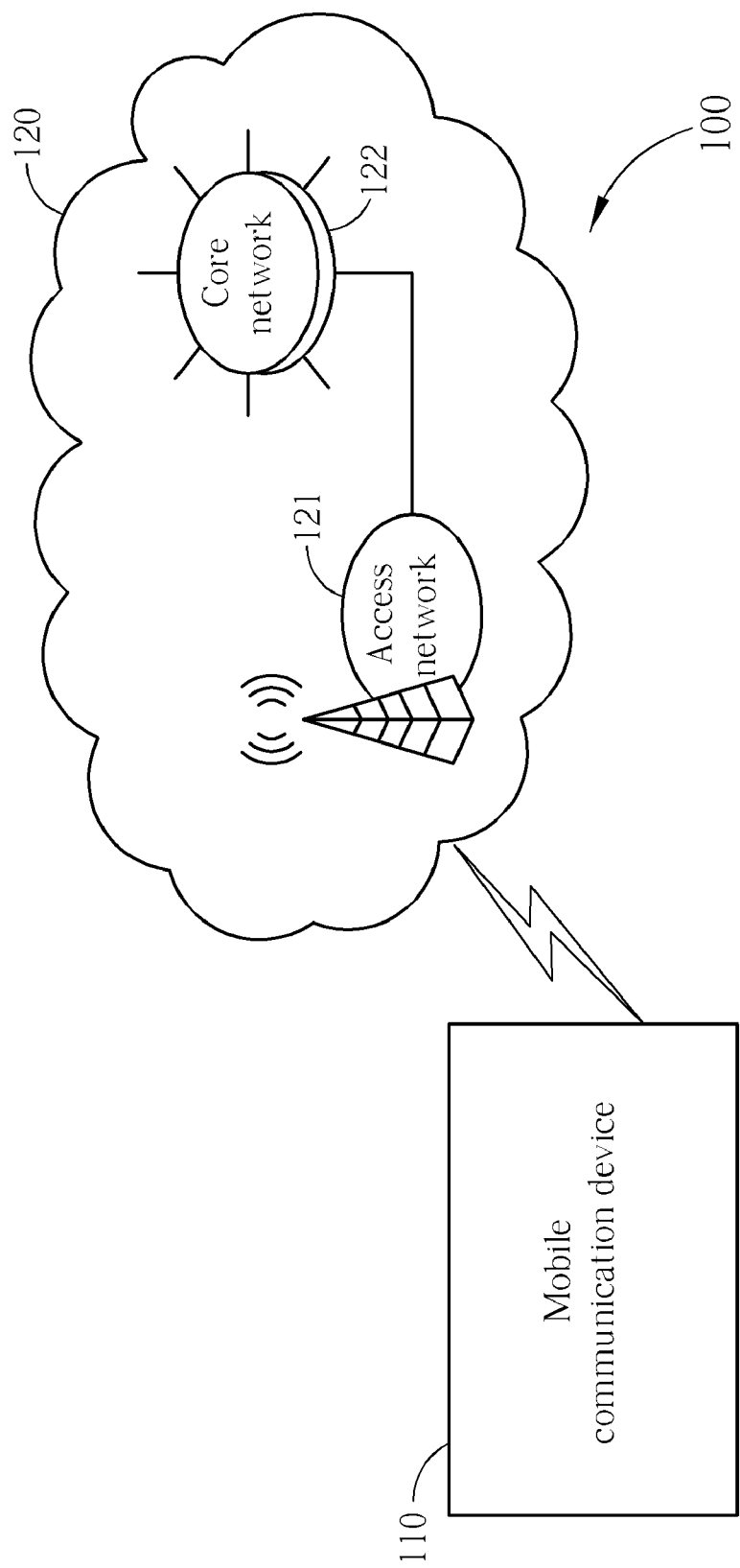
FIG. 1 is a schematic diagram of an exemplary wireless communication system.

Please refer to FIG. 1, which illustrates a block diagram of a wireless communication system according to an embodiment of the invention. In the wireless communication system 100, the user equipment (UE) 110 is wirelessly connected to the service network 120 for obtaining wireless services. The service network 120 comprises an access network (or called radio access network) 121 and a core network 122. The service network 120 may be a network in compliance with the Global System for Mobile Communication (GSM), Universal Mobile Telecommunications System (UMTS), or Evolved Packet System (EPS) technology. The access network 121 may be a GSM Edge Radio Access Network (GERAN) in the GSM technology, a UMTS Terrestrial Radio Access Network (UTRAN) in the WCDMA/HSPA technology, or an Evolved-UTRAN (E-UTRAN) in the LTE/LTE-Advanced technology, and the core network 122 may be a GSM core or General Packet Radio Service (GPRS) core in the GSM/UMTS system or an Evolved Packet Core (EPC) in the EPS system.

In FIG. 1, the access network 121 and the UE 110 are simply utilized for illustrating the structure of the wireless communication system 100. Practically, the access network of the LTE system comprises a plurality of base stations such as an E-UTRAN (evolved-UTAN), which comprises a plurality of evolved Node-Bs (eNBs). In EPS, the core network includes a mobility management entity (MME). The MME is responsible for the delivery of data packets to the mobile devices back and forth within its geographical service area, including packet routing and transfer, mobility management (attach/detach and tracking area management), session management (PDN connection establishment/disconnect), logical link management, and authentication and charging functions. The MME can also serve as a local mobility anchor for inter-working with other RATs (e.g. GSM and UMTS). The access network of the UMTS system comprises a plurality of base stations such as an UTRAN, which comprises a plurality of Node-Bs (NBs). In UMTS, the core network includes a Serving GPRS Support Node (SGSN) is responsible for the delivery of data packets to the mobile devices back and forth within its geographical service area, including packet routing and transfer, mobility management (attach/detach and tracking area management), session management (PDP Context establishment/disconnect), logical link management, and authentication and charging functions. The access network of the GSM system comprises a plurality of base stations such as a GERAN, which comprises a plurality of Base stations (BSSs). In GSM, the core network includes a Mobile Switching Center (MSC) is responsible for the delivery of voice in circuit switch manner to the mobile devices back and forth within its geographical service area, including mobility management (attach/detach and location area management), logical link management, and authentication and charging functions. The UE can be a device such as a mobile phone, a computer system, etc. Besides, the access network 121 and the UE 110 can be seen as a transmitter or receiver according to transmission direction, e.g., for uplink, the UE 110 is the transmitter and the network 121 is the receiver, and for downlink, the network 121 is the transmitter and the UE is the receiver.

In the following embodiments, the service network 120 may be a GSM/UMTS/EPS network belonging to a specific PLMN, and the UE 110 may be a Mobile Station (MS). The UMTS/EPS network is in compliance with the 3GPP TS 23.060/TS 23.401 specifications, 3GPP TS 24.008/TS 24.301 specifications, and/or other related UMTS/EPS specifications. Based on the technology used, the messages of Mobility Management (MM) operations may correspond to the GSM/UMTS/EPS technology, respectively, e.g. MM message for Location Area Update, GMM message for Routing Area Update, and EPS Mobility Management (EMM) message for Tracking Area Update. Further, the TAU/RAU procedure may be a combined TA/LA or combined RA/LA procedure in which the TAU/RAU REQUEST message indicates that the UE 110 wishes to perform TA/RA and LA update for a Packet-Switched domain and a Circuit-Switched (CS) domain, respectively.

Please note that this invention can be applied to the UE 110 and the core network 122 when the UE 110 is rejected by not only the TAU, RAU requests but also a service request and a location area update request, such variation are also included in the scope of the present invention. The TAU request corresponds to an EPS system; the RAU request corresponds to Packet Switched domain in a GSM/GPRS system; the location area update corresponds to Circuit Switched domain in a GSM/GPRS system.

Figure 2:
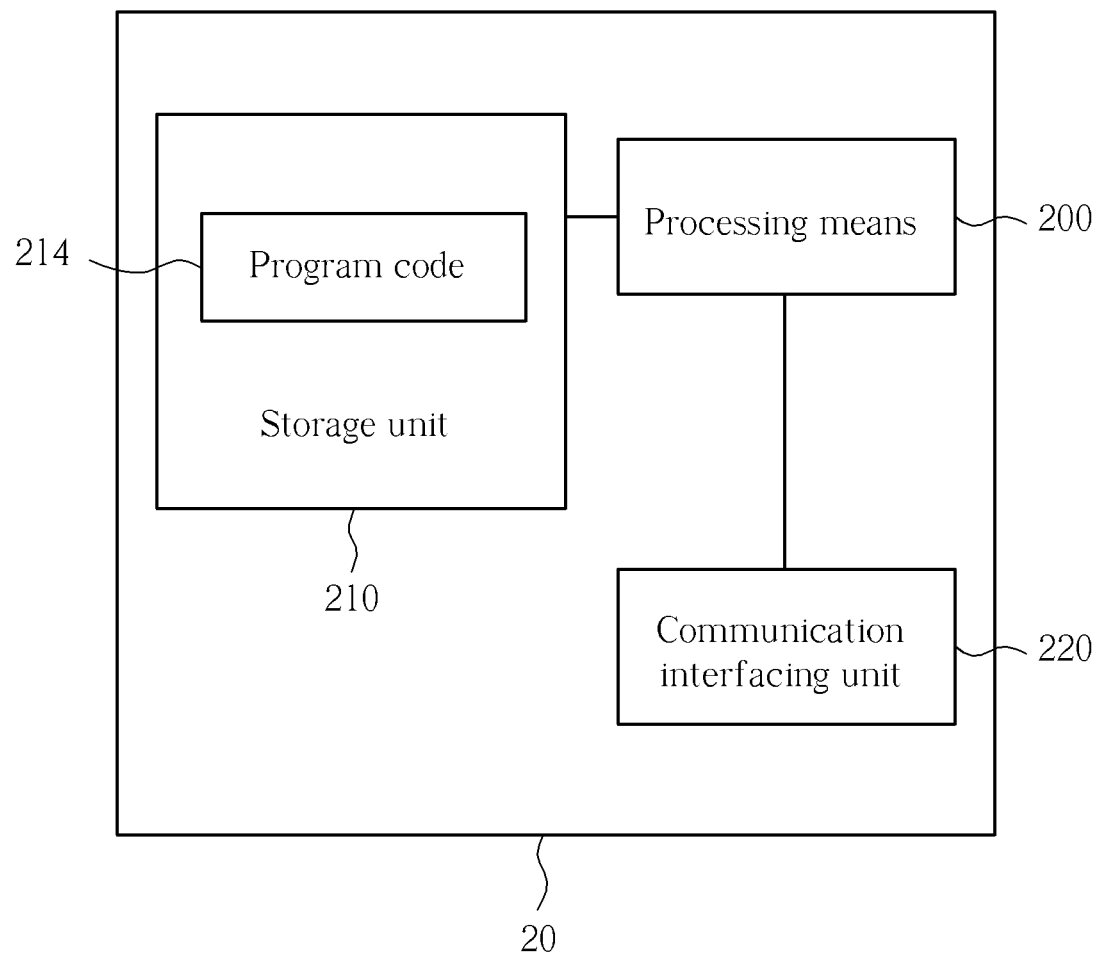
FIG. 2 is a schematic diagram of an exemplary communication device.

Please refer to FIG. 2, which is a schematic diagram of an exemplary communication device 20. The communication device 20 can be the UE or the core network 122 shown in FIG. 1, but is not limited herein. The communication device 20 may include a processor 200 such as a microprocessor or an Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, hard disk, and optical data storage device. The communication interfacing unit 220 is preferably a transceiver and can handle timer configuration according to processing results of the processor 200.

Periodic tracking/routing area updating (TAU/RAU) is used to periodically notify the availability of the UE to the network. The procedure is controlled in the UE by the periodic tracking/routing area update timer (timer T3412/T3312). The value of timer T3412/T3312 is sent by the core network 122 to the UE in the ATTACH ACCEPT message and can be sent in the TRACKING/ROUTING AREA UPDATE ACCEPT message. The UE shall apply this value in all tracking/routing areas of the list of tracking/routing areas assigned to the UE, until a new value is received. The two separate timers (timer T3412/T3312) run in the UE for notifying availabilities to MME/SGSN/MSC and updating MME/SGSN independently. When APN (access point node) based congestion or general NAS level mobility management congestion happens, the core network 122 (e.g. MME/SGSN) rejects an attach request, a tracking area update (TAU), a routing area update (RAU) or a service request and the MME replies the UE with a Mobility Management (MM) back-off timer.

When a normal attached UE (EMM-Registered state) gets rejection with a MM back-off timer due to tracking area update reject or service reject. The UE is normal attached but enters ECM-IDLE mode when the MM back-off timer is running. When the MM back-off timer is running, the back-off UE is still allowed to make emergency call by PDN connectivity request with request type of emergency to an MME.

Figure 3:
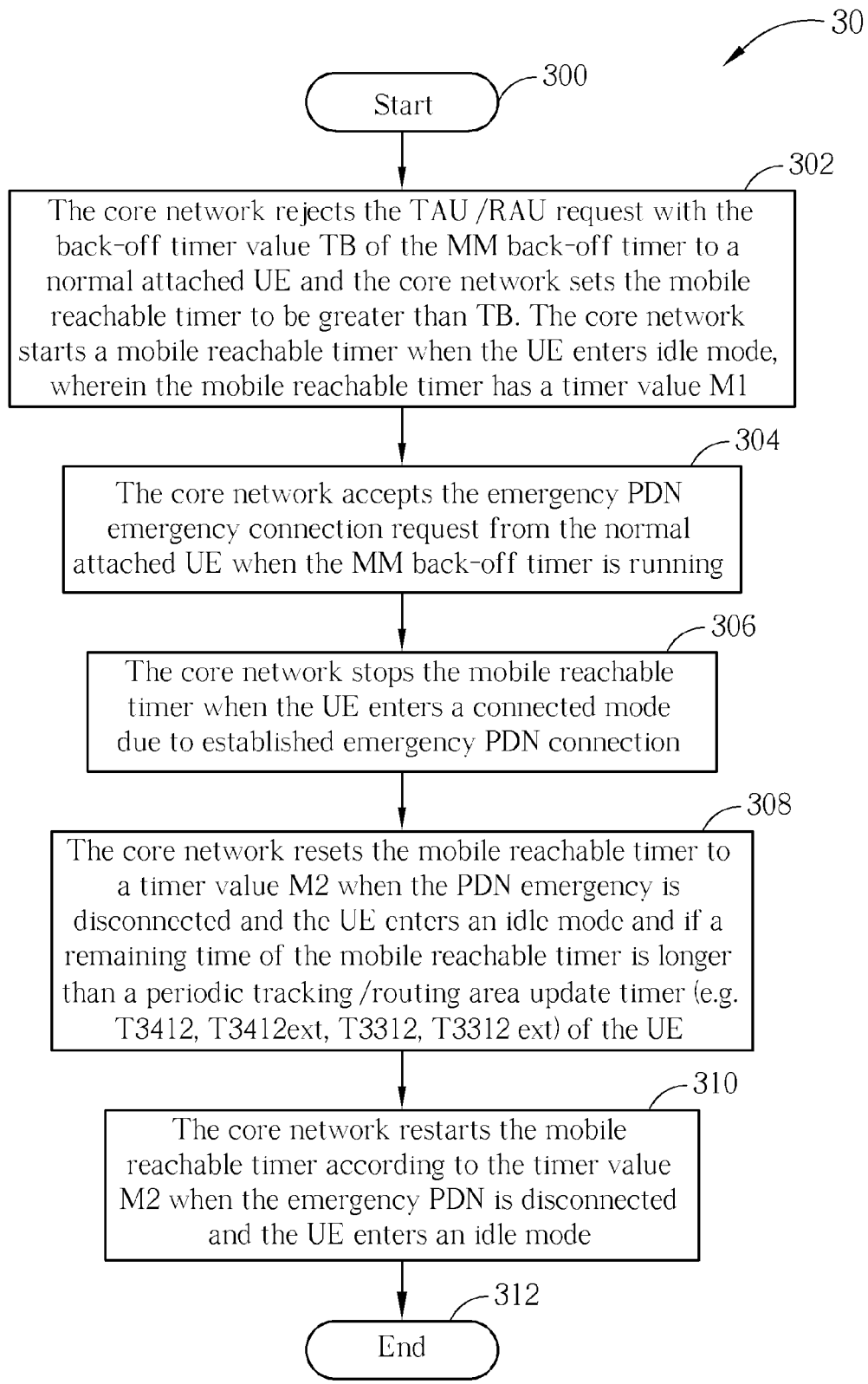
FIGS. 3-5 are flowcharts of exemplary processes.

Please refer to FIG. 3, which is a flowchart of an exemplary process 30. The process 30 is used for handling an emergency PDN connection for the core network 122 (e.g. MME/SGSN) in the wireless communication system 100. The core network 122 receives a TAU/RAU request from the UE and sends a TAU/RAU update reject message including a back-off timer value TB of a MM back-off timer when the core network 122 rejects the TAU/RAU request. The process 30 may be compiled into the program code 214 and includes the following steps:

Step 300: Start.

Step 302: The core network 122 rejects the TAU/RAU request with the back-off timer value TB of the MM back-off timer to a normal attached UE and the core network 122 sets the mobile reachable timer to be greater than TB. The core network 122 starts a mobile reachable timer when the UE enters idle mode, wherein the mobile reachable timer has a timer value M1.

Step 304: The core network 122 accepts the emergency PDN connection request from the normal attached UE when the MM back-off timer is running.

Step 306: The core network 122 stops the mobile reachable timer when the UE enters a connected mode due to established emergency PDN connection.

Step 308: The core network 122 resets the mobile reachable timer to a timer value M2 when the emergency PDN is disconnected and the UE enters an idle mode and if a remaining time of the mobile reachable timer is longer than a periodic tracking/routing area update timer (e.g. T3412, T3412ext, T3312, T3312 ext) of the UE.

Step 310: The core network 122 restarts the mobile reachable timer according to the timer value M2 when the emergency PDN is disconnected and the UE enters an idle mode.

Step 312: End.

According to the process 30, the core network 122 (e.g. MME/SGSN) starts the mobile reachable timer with the timer value M1 when the UE enters idle mode. When the MM back-off timer is running, the core network 122 receives the emergency PDN connection request made by the UE. The core network 122 accepts the request for the emergency PDN connection from the normal attached UE. The core network 122 therefore stops the mobile reachable timer. When the emergency PDN is disconnected and the UE enters idle mode, if the remaining time of the MM back-off timer is longer than the periodic TAU/RAU timer, i.e. the periodic TAU/RAU timer expires before the MM back-off timer, the core network 122 resets the mobile reachable timer to the timer value M2.

The timer value M2 is greater than the remaining time of the back-off timer. Preferably, the timer value M2 is four minutes longer than the remaining time of the back-off timer. Then the core network 122 restarts the mobile reachable timer according to the timer value M2. For example, the core network 122 stores the MM back-off timer in the EMM context per UE basis when the network allocates the MM back-off timer to the UE. With this stored value, the core network 122 can obtain the remaining time of the back-off timer when needed.

Figure 4:
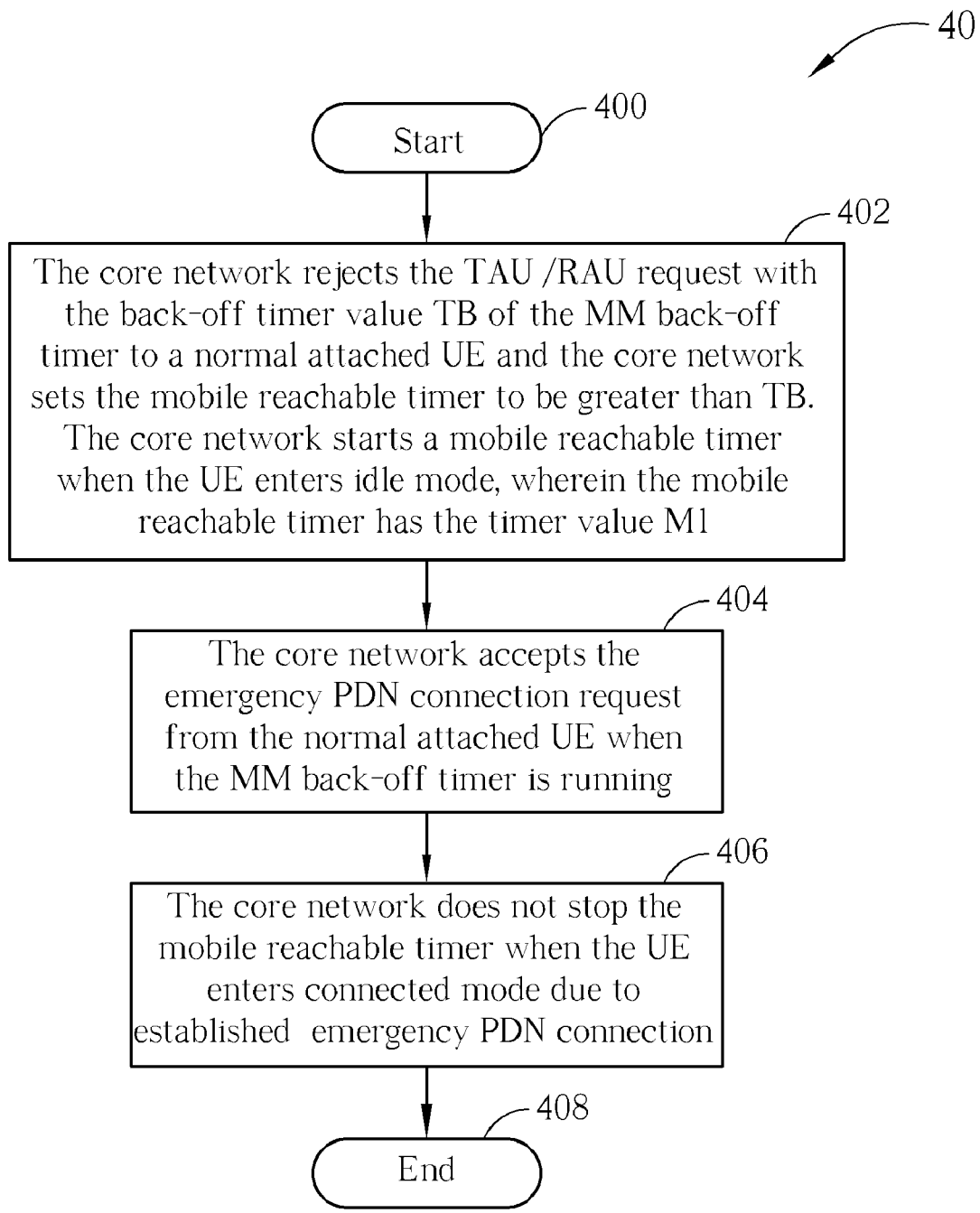

Please refer to FIG. 4, which is a flowchart of an exemplary process 40. The process 40 is used for handling an emergency PDN connection for the core network 122 (e.g. MME/SGSN) in the wireless communication system 100. The core network 122 receives a TAU/RAU request from the UE and sends a TAU/RAU reject message including a back-off timer value TB of a MM back-off timer when the core network 122 rejects the TAU/RAU request. The process 40 may be compiled into the program code 214 and includes the following steps:

Step 400: Start.

Step 402: The core network 122 rejects the TAU/RAU request with the back-off timer value TB of the MM back-off timer to a normal attached UE and the core network 122 sets the mobile reachable timer to be greater than TB. The core network 122 starts a mobile reachable timer when the UE enters idle mode, wherein the mobile reachable timer has the timer value M1.

Step 404: The core network 122 accepts the emergency PDN connection request from the normal attached UE when the MM back-off timer is running.

Step 406: The core network 122 does not stop the mobile reachable timer when the UE enters connected mode due to established emergency PDN connection.

Step 408: End.

According to the process 40, the core network 122 (e.g. MME/SGSN) starts the mobile reachable timer with the timer value M1 when the UE enters idle mode. When the MM back-off timer is running, the core network 122 receives the emergency PDN connection request made by the UE. The core network 122 accepts the request for the emergency PDN connection from the normal attached UE. However, the core network 122 does not stop the mobile reachable timer or implicit timer for the UE when the UE enters connected mode due to established emergency PDN connection. When the mobile reachable timer or implicit detach timer is expired and there exists an emergency PDN connection on the UE, the core network 122 does not detach the UE. On the other hand, the UE does not detach locally when there is MM back-off timer running.

When the core network 122 allocates the MM back-off timer to the UE, the core network 122 sets the MM back-off indicator as active, which shows the back-off status of the UE, in the EMM context per UE basis. The MM back-off indicator is set inactive when the MM back-off timer or mobile reachable timer is expired or the UE contacts the network. With the back-off indicator, the core network 122 determines whether or not stop mobile reachable timer or implicit detach timer when the UE enters connected mode due to established emergency PDN connection.

Figure 5:
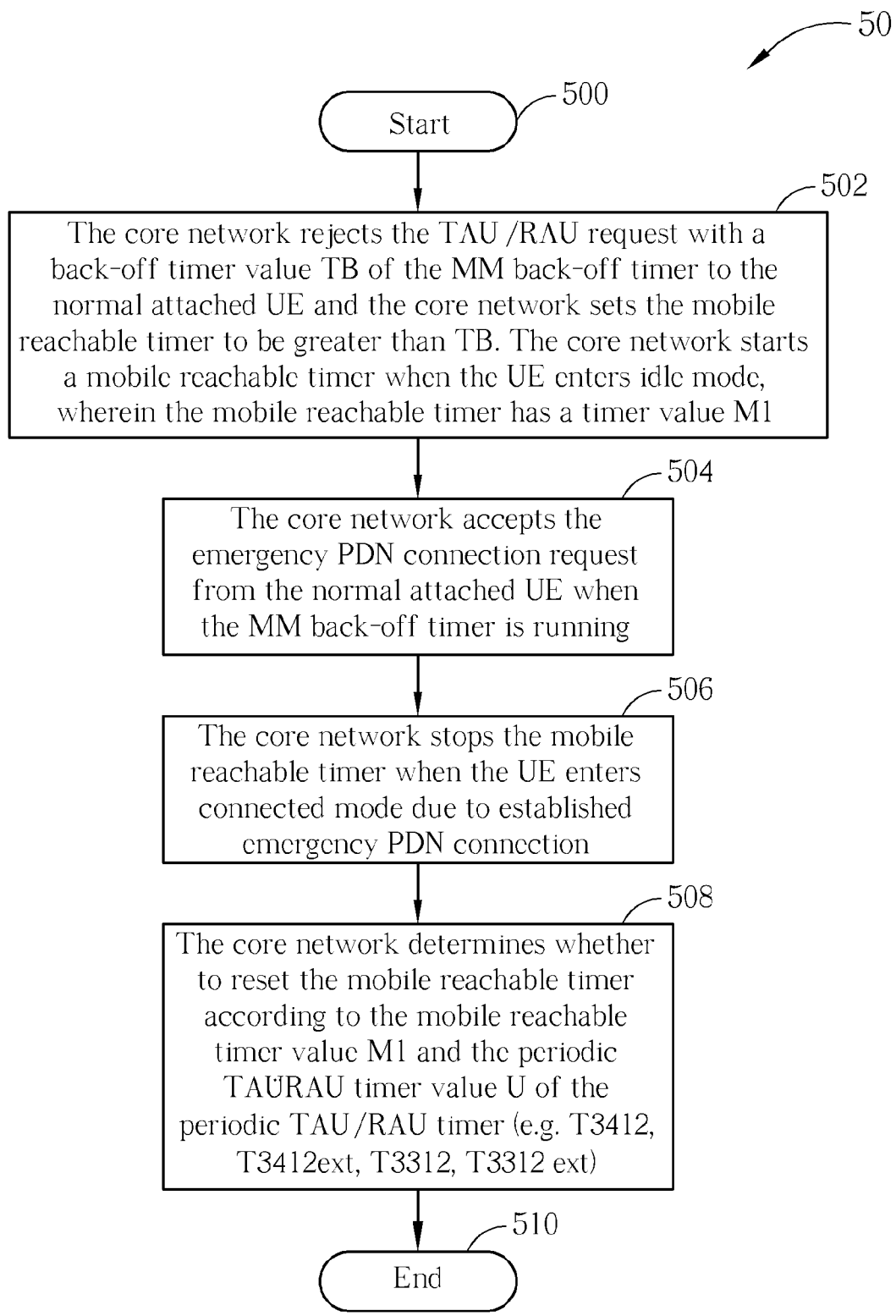

Please refer to FIG. 5, which is a flowchart of an exemplary process 50. The process 50 is used for handling an emergency PDN connection for the core network 122 (e.g. MME/SGSN) in the wireless communication system 100. The core network 122 receives a TAU/RAU request from the UE and sends a TAU/RAU reject message including a back-off timer value TB of a MM back-off timer when the core network 122 rejects the TAU/RAU request. The process 50 may be compiled into the program code 214 and includes the following steps:

Step 500: Start.

Step 502: The core network 122 rejects the TAU/RAU request with a back-off timer value TB of the MM back-off timer to the normal attached UE and the core network 122 sets the mobile reachable timer to be greater than TB. The core network 122 starts a mobile reachable timer when the UE enters idle mode, wherein the mobile reachable timer has a timer value M1.

Step 504: The core network 122 accepts the emergency PDN connection request from the normal attached UE when the MM back-off timer is running.

Step 506: The core network 122 stops the mobile reachable timer when the UE enters connected mode due to established emergency PDN connection.

Step 508: The core network 122 determines whether to reset the mobile reachable timer according to the mobile reachable timer value M1 and the periodic TAU/RAU timer value U of the periodic TAU/RAU timer (e.g. T3412, T3412$ext$, T3312, T3312 ext).

Step 510: End.

According to the process 50, the core network 122 (e.g. MME/SGSN) starts the mobile reachable timer with the timer value M1 when the UE enters idle mode. When the MM back-off timer is running, the core network 122 receives the emergency PDN connection request made by the UE. The core network 122 accepts the request for the emergency PDN connection from the normal attached UE. The core network 122 therefore stops the mobile reachable timer. When the emergency PDN connection is disconnected and the UE enters idle mode, the core network 122 determines whether to reset the mobile reachable timer according to the mobile reachable timer value M1 and the periodic TAU/RAU timer value U of the periodic TAU/RAU timer.

For example, the core network 122 has a remaining time T1 of the mobile reachable timer and an elapsed time caused by the emergency PDN connection denotes as T. When the emergency PDN connection is disconnected and the UE enters idle mode, the core network 122 sets the mobile reachable timer if $((T1-4)-T)>0$ and $((T1-4)-T)>U$, i.e. the remaining time of the MM back-off timer is greater than periodic TAU/RAU timer value. Then the core network 122 starts the mobile reachable timer with the value (T1−T). If (T1−4)=T or (T1−4)<T, the core network 122 starts the mobile reachable timer with the initial value of the periodic TAU/RAU timer. In this example, the core network 122 needs to handle T1 and T based on the back-off status indicator set when it assigns a back-off timer to a UE in the NAS reject message.

Figure 5B:
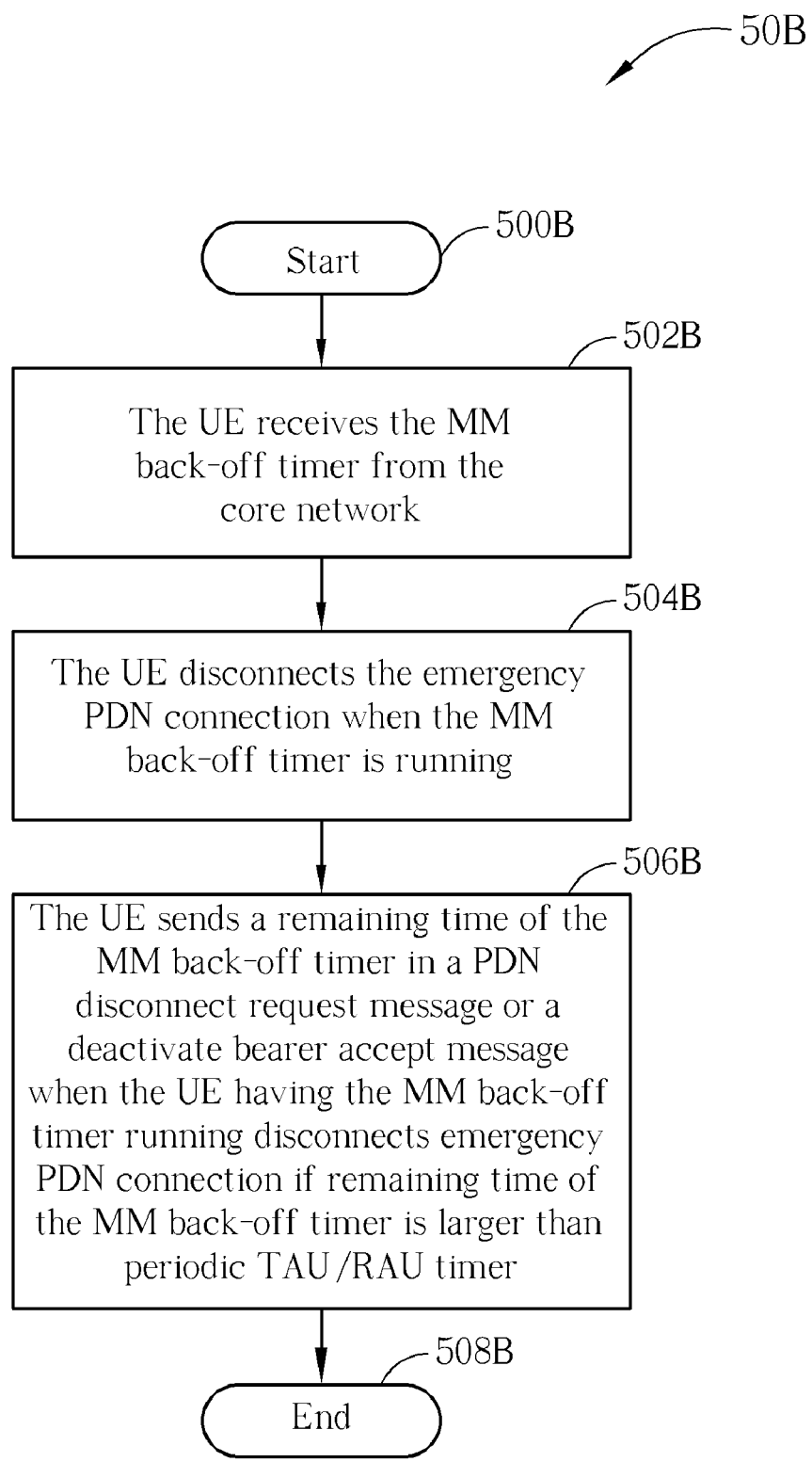
FIG. 5B is a flowchart of exemplary process.

Please refer to FIG. 5B, which is a flowchart of an exemplary process 50B. The process 50B is used for handling an emergency PDN connection for the UE for in the wireless communication system 100. The core network 122 receives a TAU/RAU request from the UE and sends a TAU/RAU reject message including a back-off timer value TB of a MM back-off timer when the core network 122 rejects the TAU/RAU request. The process 50B may be compiled into the program code 214 and includes the following steps:

Step 500B: Start.

Step 502B: The UE receives the MM back-off timer from the core network 122.

Step 504B: The UE disconnects the emergency PDN connection when the MM back-off timer is running.

Step 506B: The UE sends a remaining time of the MM back-off timer in a PDN disconnect request message or a deactivate bearer accept message when the UE having the MM back-off timer running disconnects emergency PDN connection if remaining time of the MM back-off timer is larger than periodic TAU/RAU timer.

Step 508B: End.

According to the process 50B, when the UE having the MM back-off timer running disconnects emergency PDN connection, if the remaining time of the MM back-off timer is larger than periodic TAU/RAU timer, the UE sends the remaining time of the MM back-off timer t in the PDN disconnect request message or Deactivate bearer context accept message. As a result, the network resets mobile reachable timer to a new value which is slightly larger than the received remaining time of the MM back-off timer.

Figure 6:
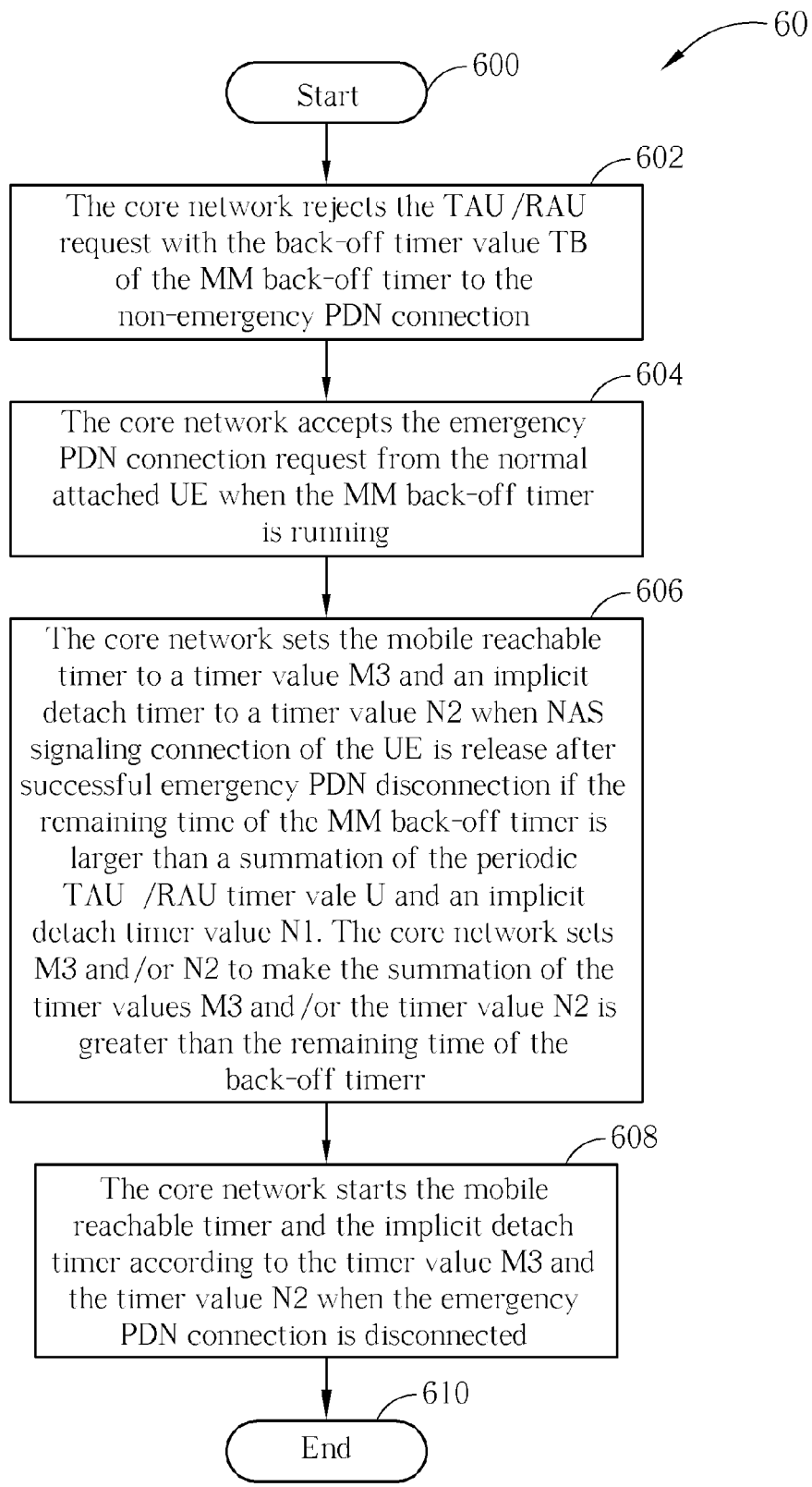
FIGS. 6-9 are flowcharts of exemplary processes.

Please refer to FIG. 6, which is a flowchart of an exemplary process 60. The process 60 is used for handling an emergency PDN connection for the core network 122 (e.g. MME/SGSN) in the wireless communication system 100. The core network 122 receives a TAU/RAU request from the UE and sends a TAU/RAU update reject message including a back-off timer value TB of a MM back-off timer when the core network 122 rejects the TAU/RAU request. The process 60 may be compiled into the program code 214 and includes the following steps:

Step 600: Start.

Step 602: The core network 122 rejects the TAU/RAU request with the back-off timer value TB of the MM back-off timer to a normal attached UE.

Step 604: The core network 122 accepts the emergency PDN connection request from the normal attached UE when the MM back-off timer is running.

Step 606: The core network 122 sets the mobile reachable timer to a timer value M3 and an implicit detach timer to a timer value N2 when NAS signaling connection of the UE is release after successful emergency PDN disconnection if the remaining time of the MM back-off timer is larger than a summation of the periodic TAU/RAU timer vale U and an implicit detach timer value N1. The core network 122 sets M3 and/or N2 to make the summation of the timer values M3 and/or the timer value N2 is greater than the remaining time of the back-off timer.

Step 608: The core network 122 starts the mobile reachable timer and/or the implicit detach timer according to the timer value M3 and the timer value N2 when the emergency PDN connection is disconnected.

Step 610: End.

According to the process 60, the core network 122 (e.g. MME/SGSN) starts the mobile reachable timer with the timer value M1 when the UE enters idle mode. When the MM back-off timer is running, the core network 122 receives the emergency PDN connection request made by the UE. The core network 122 accepts the request for the emergency PDN connection from the normal attached UE. The core network 122 therefore stops the mobile reachable timer or implicit detach timer. When the emergency PDN is disconnected and the UE enters idle mode, if a remaining time of the MM back-off timer is larger than the summation of the periodic TAU/RAU timer vale U and the implicit detach timer value N1. The summation of the timer values M3 and/or the timer value N2 is greater than the remaining time of the back-off timer. The core network 122 starts the mobile reachable timer and/or the implicit detach timer according to the timer value M3 and the timer value N2 when the emergency PDN connection is disconnected. For example, the core network 122 stores the MM back-off timer in the EMM context per UE basis when the network allocates the MM back-off timer to the UE. With this stored value, the core network 122 can obtain the remaining time of the back-off timer when needed.

Figure 7:
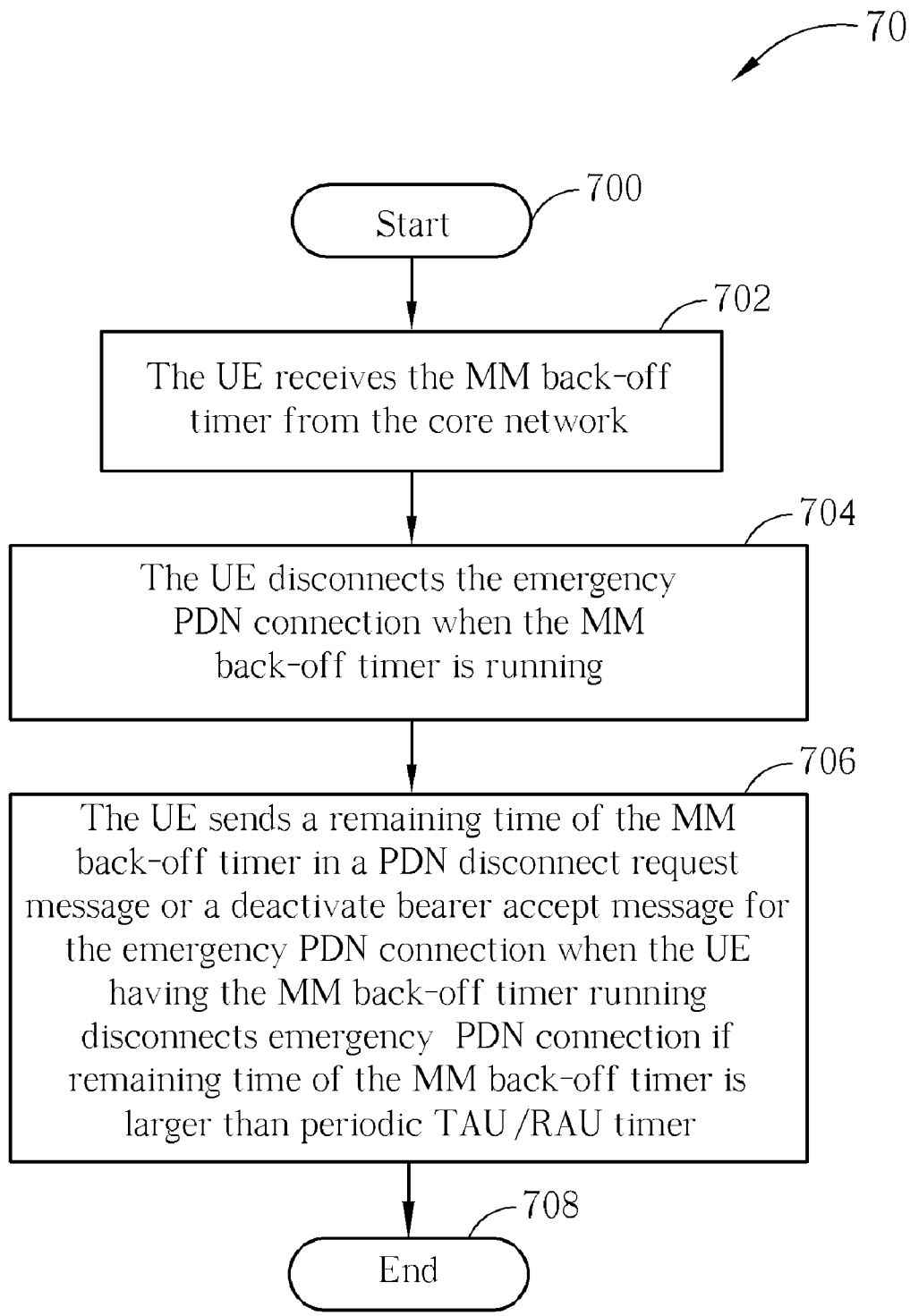

Please refer to FIG. 7, which is a flowchart of an exemplary process 70. The process 70 is used for handling an emergency PDN connection for the UE for in the wireless communication system 100. The core network 122 receives a TAU/RAU request from the UE and sends a TAU/RAU reject message including a back-off timer value TB of a MM back-off timer when the core network 122 rejects the TAU/RAU request. The process 70 may be compiled into the program code 214 and includes the following steps:

Step 700: Start.

Step 702: The UE receives the MM back-off timer from the core network 122.

Step 704: The UE disconnects the emergency PDN connection when the MM back-off timer is running.

Step 706: The UE sends a remaining time of the MM back-off timer in a PDN disconnect request message or a deactivate bearer accept message for the emergency PDN connection when the UE having the MM back-off timer running disconnects emergency PDN connection if remaining time of the MM back-off timer is larger than periodic TAU/RAU timer.

Step 708: End.

According to the process 70, when the UE having the MM back-off timer running disconnects emergency PDN connection, if the remaining time of the MM back-off timer is larger than the periodic TAU/RAU timer, the UE sends the remaining time of the MM back-off timer t in the PDN disconnect request message or Deactivate bearer context accept message. As a result, if the remaining time of the MM back-off timer is larger than the summation of the periodic TAU/RAU timer and the implicit detach timer, the network resets the mobile reachable timer and/or the implicit detach timer to new values, so that the summation of the mobile reachable timer and the implicit detach timer is slightly larger than the remaining time of the MM back-off timer.

Figure 8:
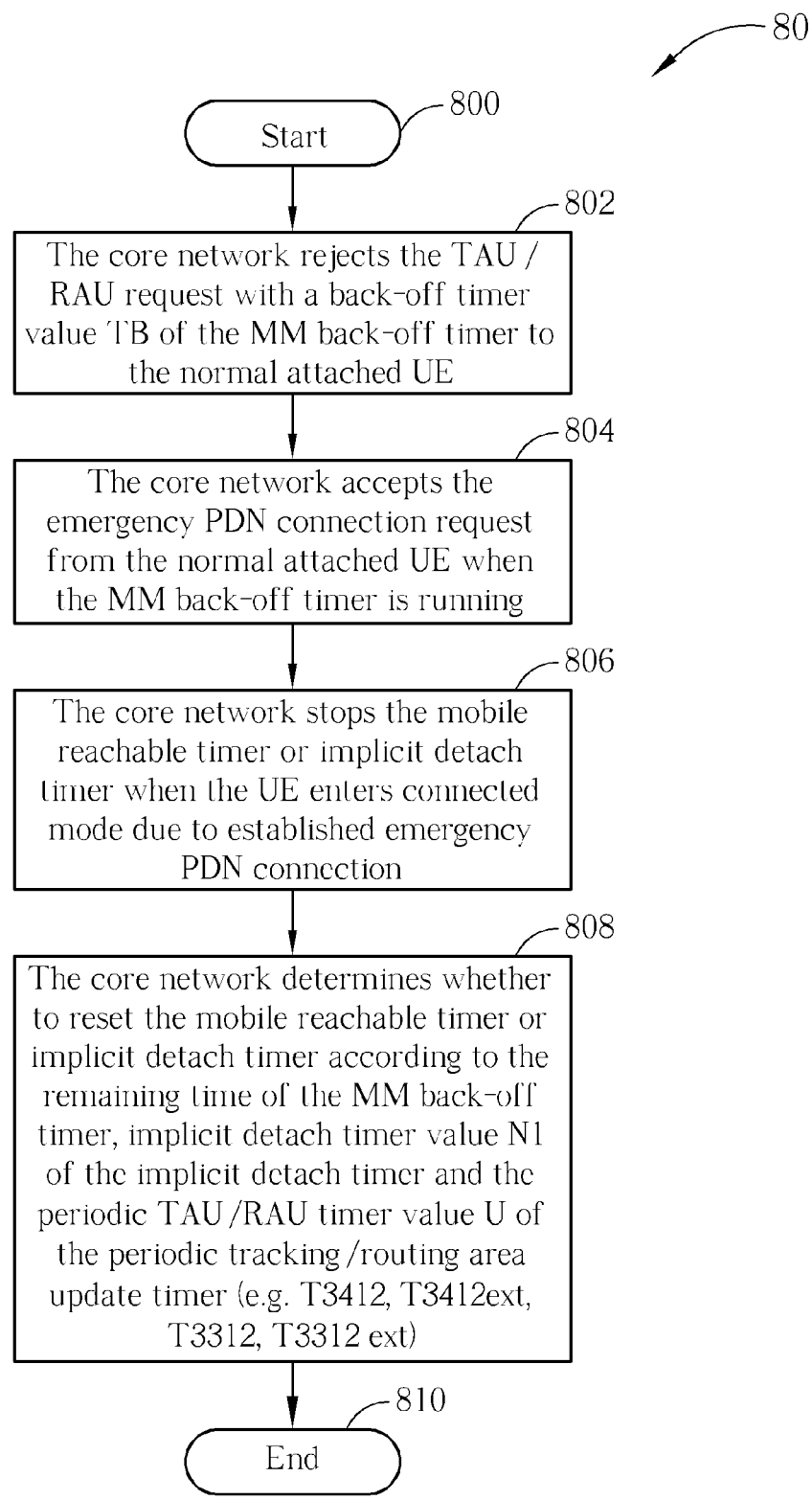

Please refer to FIG. 8, which is a flowchart of an exemplary process 80. The process 80 is used for handling an emergency PDN connection for the core network 122 (e.g. MME/SGSN) in the wireless communication system 100. The core network 122 receives a TAU/RAU request from the UE and sends a TAU/RAU reject message including a back-off timer value TB of a MM back-off timer when the core network 122 rejects the TAU/RAU request. The process 50 may be compiled into the program code 214 and includes the following steps:

Step 800: Start.

Step 802: The core network 122 rejects the TAU/RAU request with a back-off timer value TB of the MM back-off timer to the normal attached UE.

Step 804: The core network 122 accepts the emergency PDN connection request from the normal attached UE when the MM back-off timer is running.

Step 806: The core network 122 stops the mobile reachable timer or implicit detach timer when the UE enters connected mode due to established emergency PDN connection.

Step 808: The core network 122 determines whether to reset the mobile reachable timer or implicit detach timer according to the remaining time of the MM back-off timer, implicit detach timer value N1 of the implicit detach timer and the periodic TAU/RAU timer value U of the periodic tracking/routing area update timer (e.g. T3412, T3412ext, T3312, T3312 ext).

Step 810: End.

According to the process 80, the core network 122 (e.g. MME/SGSN) starts the mobile reachable timer with the timer value M1 when the UE enters idle mode. When the MM back-off timer is running, the core network 122 receives the emergency PDN connection request made by the UE. The core network 122 accepts the request for the emergency PDN connection from the normal attached UE. The core network 122 therefore stops the mobile reachable timer or implicit detach timer. When the emergency PDN connection is disconnected and the UE enters idle mode, the core network 122 determines whether to reset the mobile reachable timer according to the periodic TAU/RAU timer value U of the periodic tracking/routing area update timer and the implicit detach timer value N1 of the implicit detach timer.

For example, a remaining time for the summation of the mobile reachable timer and the implicit detach timer is denoted as T2 and still the elapsed time caused by the emergency PDN connection denotes as T. The core network 122 resets both of the mobile reachable timer and the implicit detach timer when (T2−T)>(periodic area update timer value U plus implicit detach timer value N1) so that the summation of the mobile reachable timer and the implicit detach timer is greater than the value (T2−T). In this example, the core network 122 needs to handle T2 and T based on the back-off status indicator set when it assigns a back-off timer to a UE in the NAS reject message.

Figure 9:
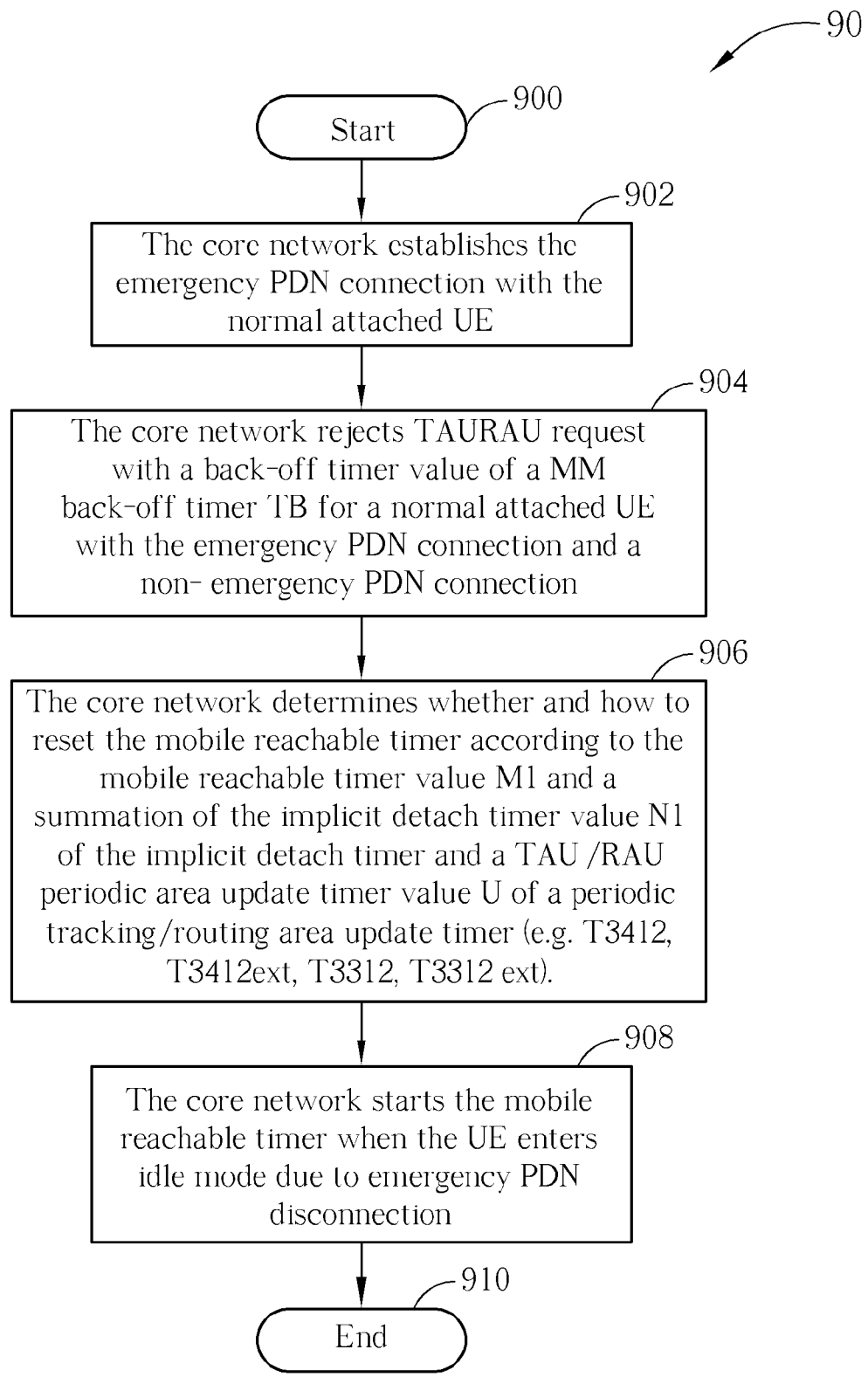

The normal attached UE (EMM-Registered state) may have one non-emergency PDN connection and one emergency PDN connection. When the normal attached UE with one non-emergency PDN connection and one emergency PDN connection, the normal attached UE may get rejection with a MM back-off timer due to tracking area update rejector service reject for the non-emergency PDN connection. Therefore, the aforementioned processes 80 can be modified as follows:

Please refer to FIG. 9, which is a flowchart of an exemplary process 90. The process 90 is used for handling an emergency PDN connection for the core network 122 (e.g. MME/SGSN) and the UE in the wireless communication system 100. The UE is normal attached and has one emergency PDN connection and one non-emergency PDN connection. The core network 122 receives a TAU/RAU or service request from the UE and sends a TAU/RAU reject message including a back-off timer value of a MM back-off timer when the core network 122 rejects the TAU/RAU or service request to the UE for the non-emergency PDN connection. The process 90 may be compiled into the program code 214 and includes the following steps:

Step 900: Start.

Step 902: The core network 122 establishes the emergency PDN connection with the normal attached UE.

Step 904: The core network 122 rejects TAU/RAU request with a back-off timer value of a MM back-off timer TB for a normal attached UE with the emergency PDN connection and a non-emergency PDN connection.

Step 906: The core network 122 determines whether and how to reset the mobile reachable timer according to the mobile reachable timer value M1 and a summation of the implicit detach timer value N1 of the implicit detach timer and a TAU/RAU periodic area update timer value U of a periodic tracking/routing area update timer (e.g. T3412, T3412ext, T3312, T3312 ext).

Step 908: The core network 122 starts the mobile reachable timer when the UE enters idle mode due to emergency PDN disconnection.

Step 910: End.

According to the process 80, the core network 122 receives the emergency PDN connection request made by the normal attached UE. The core network 122 accepts the request and the UE has both of the Emergency PDN connection and the non-emergency PDN connection. If the core network 122 rejects the TAU/RAU or service request with a MM back-off timer to the UE due to NAS level congestion control, the core network 122 stores the value of the MM back-off timer and calculates elapsed time T before the emergency PDN connection is disconnected. The UE starts the MM back-off timer if the UE receives the MM back-off timer. When the emergency PDN connection is disconnected and the UE enters idle mode, the core network 122 resets the mobile reachable timer or implicit detach timer according to the mobile reachable timer value M1 and the summation of the implicit detach timer value N1 of the implicit detach timer and a TAU/RAU periodic area update timer value U of a periodic tracking/routing area update timer For example, when back-off timer value TB is larger than elapsed time T and the value (TB-T) is larger than the summation of the periodic TAU/RAU timer (e.g. T3412) and the implicit detach timer, the core network 122 resets the mobile reachable timer and/or the implicit detach timer in a way that the summation of the mobile reachable timer and the implicit detach timer is larger than the summation of the remaining time of the MM back-off timer (TB-T). To be specific, the core network 122 can reset the mobile reachable timer and/or implicit detach timer when the duration of back-off timer value TB minus elapsed time T is larger than the summation of periodic TAU/RAU area update timer value U plus the implicit detach timer).

In addition, the core network 122 can receive the remaining time of the back-off timer in a PDN disconnect request message or a deactivate bearer context accept message sent by a mobile device. As a result, the core network 122 can reset mobile reachable timer and/or implicit detach timer accordingly.

The abovementioned steps of the processes about mobile reachability management can be adapted to apply to the UE and MSC in the GSM network. Those skilled in the art can readily make necessary modifications and alterations to the circuit switch system to achieve this adaptation while retaining the teachings of this invention.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, a normal attached (EMM-Registered state) UE gets rejection with a MM back-off timer due to tracking area update reject or service reject. The UE enters ECM-IDLE mode when the MM back-off timer is running. When MM back-off timer is running, the UE is still allowed to make emergency call by PDN connection request with request type of emergency to an emergency APN. When the NAS signaling connection is built due to emergency PDN connection request and the UE returns from ECM-IDLE mode to ECM-Connected mode, the core network (e.g. MME/SGSN) stops the mobile reachable timer. The core network resets the mobile reachable timer to a second timer value when a remaining time of the back-off timer is longer than a remaining time of a periodic area update timer. After the UE disconnects emergency PDN connection and NAS signaling connection is released, the mobile reachable timer is reset and started with a new timer value. In addition, the back-off UE establishes an emergency PDN connection while the MM back-off timer is running. When the back-off UE with non-emergency PDN connection and emergency PDN connection in connected mode moves to anew tracking area, before handover procedure the back-off UE requests TAU when it enters a new tracking area that is not in the TA list. The back-off UE sends a remaining time of the MM back-off timer/a back-off indicator in the TAU request/complete message. The target MME/SGSN can decide how to handle the UE with MM back-off timer running according to the TAU request/complete message.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling an emergency Packet Data Network (PDN) connection for a core network in a wireless communication system when a back-off timer is running, the method comprising:
   starting a mobile reachable timer when a mobile device enters an idle mode, wherein the mobile reachable timer has a first timer value;
   accepting the emergency PDN connection;
   stopping the mobile reachable timer when the mobile device enters a connected mode to establish the emergency PDN connection;
   resetting the mobile reachable timer to a second timer value when a remaining time of the back-off timer is longer than a periodic area update timer; and
   resetting the mobile reachable timer according to the second timer value when the emergency PDN connection is disconnected and a remaining time of the mobile reachable timer is longer than a periodic area update timer.

2. The method of claim 1, wherein the second timer value is greater than the remaining time of the back-off timer.

3. The method of claim 1, wherein the mobile device is normal attached.

4. A method of handling an emergency Packet Data Network (PDN) connection for a core network in a wireless communication system when a back-off timer is running, the method comprising:
   starting a mobile reachable timer when a mobile device enters an idle mode;
   accepting the emergency PDN connection;
   not stopping the mobile reachable timer or an implicit detach timer when the mobile device enters a connected mode to establish the emergency PDN connection;
   not locally detaching the mobile device if there exists the emergency PDN connection; and
   setting a back-off indicator as active when allocating the back-off timer to the mobile device and setting the back-off indicator as inactive when the back-off timer expires and the mobile station contacts with the core network.

5. The method of claim 4, wherein the mobile device is normal attached.

6. A method of handling an emergency Packet Data Network (PDN) connection for a core network in a wireless communication system when a back-off timer is running, the method comprising:
   starting a mobile reachable timer when a mobile device enters an idle mode;
   accepting the emergency PDN connection;
   stopping the mobile reachable timer when the mobile device enters a connected mode to establish the emergency PDN connection; and
   determining whether to reset the mobile reachable timer according to the mobile reachable timer and a periodic area update timer, wherein determining whether to reset the mobile reachable timer according to the mobile reachable timer and the periodic area update timer comprises resetting the mobile reachable timer with a value (T1−T) when a value (T1−4)>a value T and a value ((T1−4)−T)>the periodic area update timer, where T1 represents a remaining time of the mobile reachable timer and T represents an elapsed time due to the emergency PDN connection.

7. The method of claim 6, wherein determining whether to reset the mobile reachable timer according to the mobile reachable timer and a periodic area update timer comprises not resetting the mobile reachable timer when a value (T1−4) is equal to or less than a value T, where T1 represents a remaining time of the mobile reachable timer and T represents an elapsed time due to the emergency PDN connection.

8. The method of claim 6, wherein the mobile device is normal attached.

9. A method of handling an emergency Packet Data Network (PDN) connection when a back-off timer is running for a mobile device in a wireless communication system, the method comprising:
   setting at least one of a mobile reachable timer and an implicit detach timer according to a summation of a periodic area update timer and the implicit detach timer, wherein setting at least one of the mobile reachable timer and the implicit detach timer according to the summation of the periodic area update timer and the implicit detach timer comprises setting a summation of the mobile reachable timer and the implicit detach timer greater than a remaining time of the back-off timer when Non Access Stratum (NAS) signaling connection of the mobile device is released after the emergency PDN connection is disconnected and when a remaining time of the back-off timer is larger than the summation of the periodic area update timer and the implicit detach timer;
   disconnecting the emergency PDN connection when the MM back-off timer is running; and
   sending a remaining time of the back-off timer in a PDN disconnect request message or a deactivate bearer accept message when a remaining time of the back-off timer is greater than a periodic area update timer when the mobile device disconnects the emergency PDN connection.

10. A method of handling an emergency Packet Data Network (PDN) connection for a core network in a wireless communication system when a back-off timer is running, the method comprising:
    setting at least one of a mobile reachable timer and an implicit detach timer according to a summation of a periodic area update timer and the implicit detach timer, wherein setting at least one of the mobile reachable timer and the implicit detach timer according to the summation of the periodic area update timer and the implicit detach timer comprises setting a summation of the mobile reachable timer and the implicit detach timer greater than a remaining time of the back-off timer when Non Access Stratum (NAS) signaling connection of the mobile device is released after the emergency PDN connection is disconnected and when a remaining time of the back-off timer is larger than the summation of the periodic area update timer and the implicit detach timer; and
    starting at least one of the mobile reachable timer and the implicit timer when the emergency PDN connection is disconnected.

11. The method of claim 10, wherein setting the mobile reachable timer and the implicit detach timer according to the summation of the periodic area update timer and the implicit detach timer comprises setting the summation of the mobile reachable timer and the implicit detach timer greater than a value (t1−t) when the value (t1−t) is greater than a summation of the periodic area update timer and the implicit detach timer, where t1 represents a remaining time for the summation of the mobile reachable timer and the implicit detach timer, and t represents an elapsed time due to the emergency PDN connection.

12. The method of claim 10, wherein setting the mobile reachable timer and the implicit detach timer according to the summation of the periodic area update timer and the implicit detach timer comprises setting a summation of the mobile reachable timer and the implicit detach timer greater than a value (T2−T) when a value T2>a value T and the value (T2−T)>a summation of the periodic area update timer and the implicit detach timer, where T2 represents a back-off timer value of the remaining back-off timer and T represents an elapsed time due to the emergency PDN connection.

13. The method of claim 10, wherein the mobile device is normal attached.

\* \* \* \* \*